US009722675B2

(12) United States Patent
Lange

(10) Patent No.: US 9,722,675 B2
(45) Date of Patent: Aug. 1, 2017

(54) MULTISTAGE COMBINING SUB-SYSTEM FOR DISTRIBUTED ANTENNA SYSTEM

(71) Applicant: COMMSCOPE TECHNOLOGIES LLC, Hickory, NC (US)

(72) Inventor: Keld Knut Lange, Oetisheim (DE)

(73) Assignee: CommScope Technologies LLC, Hickory, NC (US)

(*) Notice: Subject to any disclaimer, the term of this patent is extended or adjusted under 35 U.S.C. 154(b) by 4 days.

(21) Appl. No.: 14/655,606

(22) PCT Filed: Mar. 5, 2015

(86) PCT No.: PCT/US2015/018922
§ 371 (c)(1),
(2) Date: Jun. 25, 2015

(87) PCT Pub. No.: WO2015/156927
PCT Pub. Date: Oct. 15, 2015

(65) Prior Publication Data
US 2016/0285521 A1    Sep. 29, 2016

Related U.S. Application Data

(60) Provisional application No. 61/977,273, filed on Apr. 9, 2014.

(51) Int. Cl.
*H04B 7/08* (2006.01)
*H04B 7/155* (2006.01)
*H04B 7/022* (2017.01)

(52) U.S. Cl.
CPC ........... *H04B 7/022* (2013.01); *H04B 7/0868* (2013.01); *H04B 7/155* (2013.01); *H04B 7/15507* (2013.01)

(58) Field of Classification Search
CPC .......... H04B 7/005; H04B 7/26; H04B 7/155; H04B 7/15507; H04B 7/022; H04B 12/006
See application file for complete search history.

(56) References Cited

U.S. PATENT DOCUMENTS 6,377,812 B1   4/2002  Rashid-Farrokhi et al.
7,391,751 B2   6/2008  Lee et al.
(Continued)

FOREIGN PATENT DOCUMENTS

CN    102752250    10/2012

OTHER PUBLICATIONS

Heath et al., A Current Perspective on Distributed Antenna Systems for the Downlink of Cellular Systems, 2013, pp. 161-167.
(Continued)

*Primary Examiner* — Andrew Lai
*Assistant Examiner* — M Mostazir Rahman
(74) *Attorney, Agent, or Firm* — Fogg & Powers LLC

(57) ABSTRACT

A multistage combining sub-system for a distributed antenna system ("DAS") is disclosed. The combining sub-system can receive broadband uplink signals from remote units of the DAS. The sub-system can divide the received broadband uplink signals into sets of narrowband uplink signals. The combining sub-system can select subsets of narrowband uplink signals from the sets of narrowband uplink signals. The subsets can be selected based on the narrowband signals in the subsets having signal powers above a threshold signal power. The combining sub-system can combine the selected subsets of narrowband uplink signals for routing to a base station. Combining the selected subsets of narrowband uplink signals can involve excluding narrowband uplink signals that are not included in the selected subsets of narrowband uplink signals.

19 Claims, 3 Drawing Sheets

(56) References Cited

U.S. PATENT DOCUMENTS

| | | |
|---|---|---|
| 7,961,689 B2 | 6/2011 | Stratford |
| 8,310,963 B2 | 11/2012 | Singh |
| 8,346,091 B2 | 1/2013 | Kummetz et al. |
| 8,681,916 B2 | 3/2014 | Braz et al. |
| 8,681,917 B2 | 3/2014 | McAllister et al. |
| 8,693,945 B2 | 4/2014 | Kummetz |
| 8,744,504 B2 | 6/2014 | Faccin et al. |
| 2004/0203394 A1 | 10/2004 | Solum |
| 2011/0274145 A1 | 11/2011 | Braz et al. |
| 2012/0257659 A1* | 10/2012 | Braz ................. H04L 7/06 375/222 |
| 2013/0051278 A1 | 2/2013 | Watkins et al. |
| 2013/0071112 A1 | 3/2013 | Melester et al. |
| 2013/0170353 A1 | 7/2013 | Liu |
| 2013/0201916 A1 | 8/2013 | Kummetz et al. |
| 2013/0279440 A1 | 10/2013 | Ookubo et al. |
| 2013/0329825 A1* | 12/2013 | Oren ................. H04B 7/0874 375/267 |
| 2013/0337750 A1 | 12/2013 | Ko |
| 2014/0003561 A1 | 1/2014 | Ranson et al. |
| 2014/0016583 A1 | 1/2014 | Smith |
| 2014/0072064 A1 | 3/2014 | Lemson et al. |
| 2015/0087329 A1* | 3/2015 | Stratford ............... H04W 64/00 455/456.1 |

OTHER PUBLICATIONS

Liu et al., An Improved Dynamic Clustering Algorithm for Multi-User Distributed Antenna System, 2009, 5 pages.
International Patent Application No. PCT/US2015/018922 , International Search Report and Written Opinion, mailed May 27, 2015, 9 pages.

* cited by examiner

MULTISTAGE COMBINING SUB-SYSTEM FOR DISTRIBUTED ANTENNA SYSTEM

CROSS-REFERENCE TO RELATED APPLICATION

This is a U.S. national phase under 35 U.S.C. 371 of International Patent Application No. PCT/US2015/018922, and titled "Multistage Combining Sub-System for Distributed Antenna System" and filed Mar. 5, 2015, which claims priority to U.S. Provisional Application Ser. No. 61/977,273, filed Apr. 9, 2014, and titled "Intelligent Multi-Stage Combining of Narrowband Signals," the contents of each of which are incorporated herein by reference.

TECHNICAL FIELD

The present disclosure relates generally to telecommunication systems and more particularly (although not necessarily exclusively) to a multistage combining sub-system for a distributed antenna system.

BACKGROUND

A distributed antenna system ("DAS") can be used to extend wireless coverage in an area. A DAS can include one or more master units or other head-end units and multiple remote units. Master units can be communicatively coupled to base stations and remote units. Remote units can wirelessly receive uplink signals from mobile communication devices or other terminal devices in a coverage area served by the DAS. A master unit can receive uplink signals from multiple remote units and combine the uplink signals for transmission to the base station.

Combining uplink signals received from multiple remote units can present disadvantages. For example, noise present in each broadband uplink signal can be combined at the master unit, thereby decreasing the signal-to-noise ratio of the combined uplink signal. Combining uplink signals can thereby degrade the signal-to-noise ratio in the combined uplink signal as compared to the signal-to-noise ratios of individual uplink signals.

SUMMARY

According to one aspect, a method is provided for multistage combining of narrowband uplink signals in a distributed antenna system ("DAS"). The method can involve receiving a first broadband uplink signal from a first remote unit of a DAS and a second broadband uplink signal from a second remote unit of the DAS. The method can also involve dividing the first broadband uplink signal into a first set of narrowband uplink signals and the second broadband uplink signal into a second set of narrowband uplink signals. The method can also involve selecting subsets of narrowband uplink signals from the first and second sets of narrowband uplink signals. The subsets of narrowband uplink signals can be selected based on narrowband signals in the subsets having signal powers above a threshold signal power. The method can also involve combining the selected subsets of narrowband uplink signals for routing to a base station. Combining the selected subsets of narrowband uplink signals can involve excluding narrowband uplink signals that are not included in the selected subsets of narrowband uplink signals.

According to another aspect, a multistage combining sub-system for a DAS is provided. The multistage combining sub-system can include filter banks, one or more selector devices, and one or more combiner devices. The filter banks can divide broadband uplink signals received from remote units of the DAS into sets of narrowband uplink signals. The selector devices can select subsets of narrowband uplink signals from the sets of narrowband uplink signals. The subsets of narrowband uplink signals can be selected based on the selected narrowband signals having signal powers above a threshold signal power. The combiner devices can combine the selected subsets of narrowband uplink signals for routing to a base station. Combining the selected subsets of narrowband uplink signals can involve excluding narrowband uplink signals that are not included in the selected subsets of narrowband uplink signals.

According to another aspect, a distributed antenna system is provided that can perform multistage combining of narrowband uplink signals. The distributed antenna system can include remote units for wirelessly communicating with terminal devices and a unit that can communicate with the remote units and a base station. The remote units can receive broadband uplink signals from the terminal devices and divide the received broadband uplink signals into sets of narrowband uplink signals. The unit can select subsets of narrowband uplink signals from the sets of narrowband uplink signals. The subsets of narrowband uplink signals can be selected based on the narrowband signals in the subsets having signal powers above a threshold signal power. The unit can also combine the selected subsets of narrowband uplink signals for routing to a base station. Combining the selected subsets of narrowband uplink signals can involve excluding narrowband uplink signals that are not included in the selected subsets of narrowband uplink signals.

These illustrative aspects and features are mentioned not to limit or define the disclosure, but to provide examples to aid understanding of the concepts disclosed in this application. Other aspects, advantages, and features of the present disclosure will become apparent after review of the entire application.

DETAILED DESCRIPTION

Figure 1:
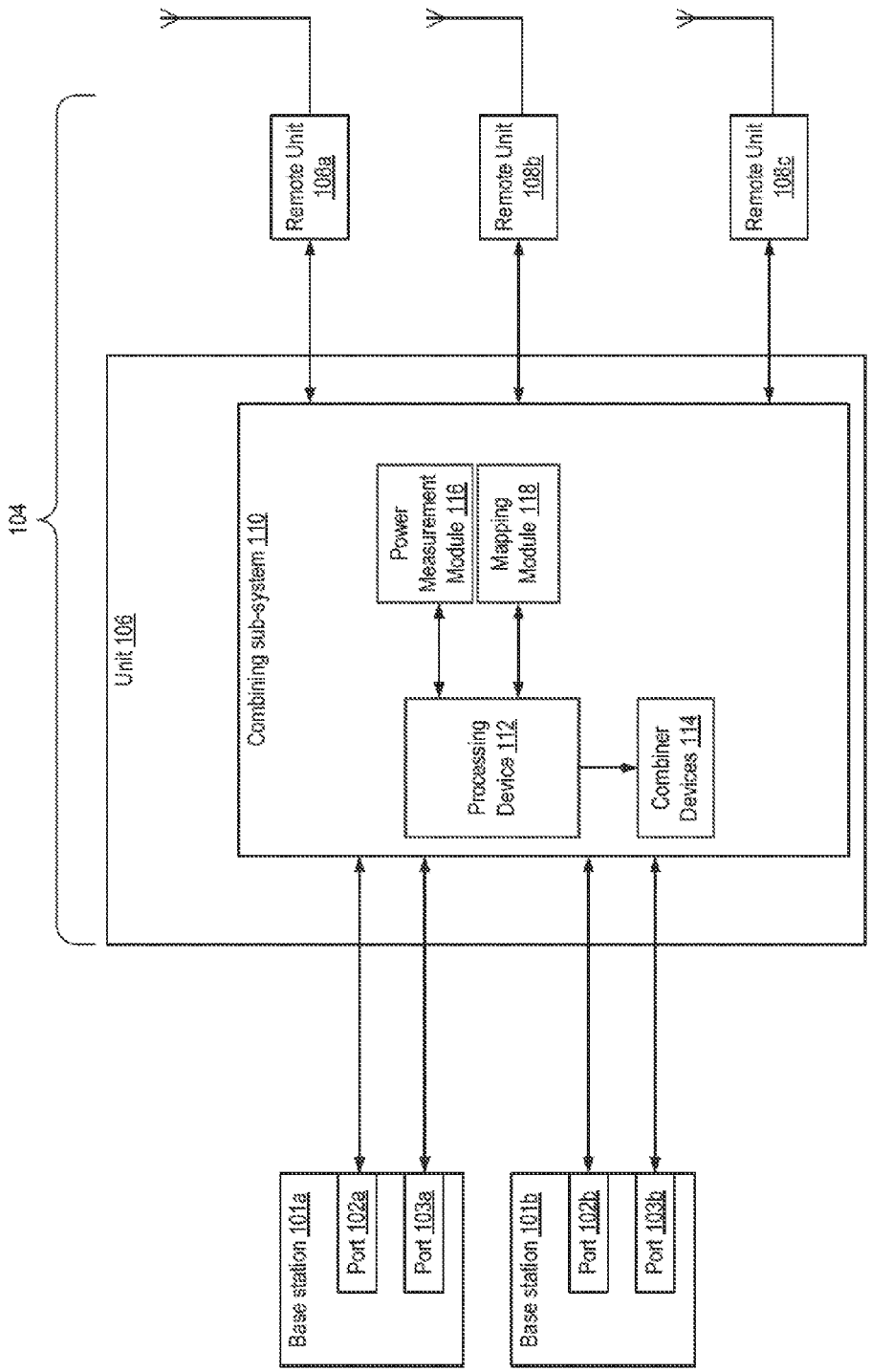
FIG. 1 is a block diagram depicting an example of a distributed antenna system ("DAS") that can include a multistage combining sub-system according to one aspect of the present disclosure.

Certain aspects and features relate to a multistage combining sub-system for a distributed antenna system ("DAS"). The multistage combining sub-system can be used for intelligently combining narrowband uplink signals having useful information for routing to a base station. The multistage combining sub-system can combine the narrowband uplink signals having useful information without including narrowband uplink signals that do not have useful information in the combination.

In some aspects, the multistage combining sub-system can receive broadband uplink signals from remote units of the DAS. The multistage combining sub-system can divide the received broadband uplink signals into sets of narrowband uplink signals. For example, the multistage combining sub-system can include filter banks in the remote units or one or more other units of the DAS. The filter banks can generate multiple frequency-shifted versions of each broadband uplink and filter the frequency-shifted versions of the broadband uplink signal to obtain a set of narrowband uplink signals corresponding to the broadband uplink signal. The multistage combining sub-system can select subsets of narrowband uplink signals having useful information from the sets of narrowband uplink signals. For example, the combining sub-system can select narrowband uplink signals having signal powers above a threshold signal power. The combining sub-system can combine the selected subsets of narrowband uplink signals for routing to one or more antenna ports of a base station. Combining the selected subsets of narrowband uplink signals can involve excluding, muting, or otherwise attenuating narrowband uplink signals that are not included in the selected subsets of narrowband uplink signals.

In some aspects, a narrowband signal can be a signal that is transmitted over a channel having a sufficiently narrow bandwidth such that the signal has a flat or substantially flat frequency response. For example, a narrowband signal having a smaller bandwidth than a narrowband channel can be transmitted using the narrowband channel bandwidth such that the narrowband signal can pass through the channel without distortion.

In some aspects, a broadband signal can be a signal that is transmitted over a channel having a sufficiently wide bandwidth that the signal does not have a flat or substantially flat frequency response. In additional or alternative aspects, a broadband signal can include a signal that includes multiple uplink transmissions from multiple terminal devices. For example, multiple terminal devices may simultaneously transmit data that is included in a broadband signal. One example in which multiple terminal devices may transmit simultaneously transmit data that is included in the broadband signal includes using spread spectrum code multiplexing (e.g., in a CDMA or UMTS system).

A remote unit can include, for example, a device that includes or is communicatively coupled to one or more antennas and that can be configured to wirelessly receive downlink signals from a base station and to wirelessly receive uplink signals from terminal devices (e.g., mobile communication devices). An example of a remote unit is a universal access point ("UAP"). In some aspects, a remote unit can be communicatively coupled (e.g., via an optical fiber) to a unit of the DAS, such as a master unit, that communicates broadband signals with a base station or other signal provider device in a telecommunication system.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

FIG. 1 is a block diagram depicting an example of a DAS 104 that can include a multistage combining sub-system 110. The DAS 104 can communicate signals between one or more base stations 101a, 101b (e.g., one or more eNodeB's) or other transceiving devices in communication with the DAS 104 (e.g., repeaters) and terminal devices in one or more coverage zones serviced by the DAS 104. The DAS 104 can communicate signals via a unit 106 (e.g., a master unit or base station router) and remote units 108a, 108b, 108c that service one or more coverage zones. The unit 106 can be communicatively coupled to antenna ports 102a, 103a of the base station 101a. The unit 106 can also be communicatively coupled to antenna ports 102b, 103b of the base station 101b. For illustrative purposes, each of the base stations 101a, 101b is depicted with two antenna ports. However, other implementations involving base stations with any number of antenna ports can be used.

The remote units 108a, 108b, 108c can include remote antenna units or other devices that can include or be communicatively coupled to one or more antennas. Remote units 108a, 108b, 108c can be configured to wirelessly communicate signals with terminal devices. Communicatively coupling devices in a DAS 102 or other telecommunication system can involve establishing, maintaining, or otherwise using a communication link (e.g., a cable, an optical fiber, a wireless link, a data bus, etc.) to communicate information, data, or other signals between devices or between components in a device.

The unit 106 can receive downlink signals from the base stations 101a, 101b and transmit uplink signals to the base stations 101a, 101b. The unit 106 can include multiple input ports for receiving downlink signals. At each port, the unit 106 can receive downlink signals having frequencies in frequency bands that are used by multiple telecommunications operators. Each telecommunications operator can communicate signals using one or more types of telecommunications technology (e.g., Global System for Mobile Communications ("GSM"), Universal Mobile Telecommunications System ("UMTS"), Long-Term Evolution ("LTE"), code-division multiple-access ("CDMA"), public services, etc.). In some aspects, the unit 106 can receive, via one or more input ports, downlink signals that have frequencies over a wide frequency bandwidth (e.g. a complete 3rd Generation Partnership Project ("3GPP") band). Downlink signals in digitized format (e.g., digital RF signals) can be communicated through the DAS 104 using one or more devices implementing a multistage aggregation, transport, and distribution system.

The unit 106 can also transmit uplink signals to the base stations 101a, 101b via communication links with one or more of the antenna ports 102a, 102b, 103a, 103b. Any suitable communication link can be used for communication between the antenna ports 102a, 102b, 103a, 103b of the base stations 101a, 101b and a unit 106. A suitable communication link can be a wired connection or a wireless connection. A wired connection can include, for example, a connection via a copper cable, an optical fiber, or another suitable communication medium. A wireless connection can include, for example, a wireless RF communication link or a microwave link.

In some aspects, the unit 106 can be a master unit or other suitable unit that can communicate with one or more base stations 101a, 101b or other transceiving devices in communication with the DAS 104. A master unit can include, for example, an optical transceiver that transmits optical signals to remote units in a DAS. The master unit or other suitable unit 106 can communicate with remote units 108a, 108b, 108c in different coverage zones of the same DAS 104. In additional or alternative aspects, the unit 106 can be included in a base station router that can communicate signals between one or more base stations 101a, 101b and one or more master units.

The remote units 108a, 108b, 108c can provide signal coverage in respective coverage zones. An example of a remote unit is a universal access point ("UAP"). Providing signal coverage in the coverage zones can include transmitting downlink signals received from the unit 106 to terminal devices in the coverage zones. Providing signal coverage in the coverage zones can also include receiving uplink signals from the mobile communication devices or other terminal devices in the coverage zones. The remote units 108a, 108b, 108c can transmit the uplink signals to the unit 106. The remote units 108a, 108b, 108c can use an air interface that supports multiple frequency bands for transmitting and receiving signals. For example, multiple RF signals can be transmitted or received by a single remote unit.

Although FIG. 1 depicts a direct connection between the unit 106 and the remote units 108a, 108b, 108c, other implementations are possible. In some aspects, the unit 106 can be connected to the remote units 108a, 108b, 108c via one or more extension units or other intermediate devices. Although FIG. 1 depicts one unit 106 and three remote units 108a, 108b, 108c, a DAS 104 can include any number of units 106 and any number of remote units. Although FIG. 1 depicts two base stations 101a, 101b in communication with the DAS 104, a DAS can communicate with any number of base stations (including one).

The DAS 104 can include a multistage combining sub-system 110. In some aspects, the multistage combining sub-system 110 can include one or more components in the unit 106, as depicted in FIG. 1. In some aspects, the multistage combining sub-system 110 can also include one or more components (e.g., filter banks) included in the respective remote units 108a, 108b, 108c.

The multistage combining sub-system 110 can be used for intelligent multistage combining of uplink signals. Intelligent multistage combining of uplink signals can reduce or prevent the degradation of the signal-to-noise ratio in combined uplink signals.

The multistage combining sub-system 110 can obtain narrowband uplink signals from a broadband uplink signal received by one or more of the remote units 108a, 108b, 108c. For example, the multistage combining sub-system 110 can split or otherwise separate a broadband uplink signal into sets of narrowband uplink signals. The combining sub-system 110 can select specific narrowband uplink signals having useful information for combining and transmission to one or more of the base stations 101a, 101b. As depicted in FIG. 1, the combining sub-system 110 can include a processing device 112, one or more combiner devices 114, a power measurement module 116, and a mapping module 118.

The processing device 112 can be communicatively coupled to the combiner devices 114, the power measurement module 116, and the mapping module 118. The processing device 112 can control the operation of the combiner devices 114 based on data received from one or more of the power measurement module 116, and the mapping module 118. Examples of processing include a microprocessor, an application-specific integrated circuit ("ASIC"), a field-programmable gate array ("FPGA"), or other suitable processor.

The power measurement module 116 can perform one or more operations for identifying the signal powers of the narrowband uplink signals. In some aspects, the power measurement module 116 can include one or more hardware devices, such as measurement receivers. The measurement receivers or other power measurement devices can provide data to the processing device 112 regarding the signal powers of the narrowband uplink signals. In additional or alternative aspects, the power measurement module 116 can include one or more program instructions stored in a memory device such as a non-transitory computer-readable medium. Examples of a non-transitory computer-readable medium include random access memory ("RAM"), read-only memory ("ROM"), magnetic disk, an ASIC, a configured processor, or other storage device. The processing device 112 can execute the instructions to obtain information about the signal powers of the narrowband uplink signals.

The mapping module 118 can perform one or more operations for mapping selected narrowband uplink signals to one or more of the antenna ports 102a, 102b, 103a, 103b. In some aspects, the mapping module 118 can include one or more hardware devices, such as measurement receivers. In additional or alternative aspects, the mapping module 118 can include one or more program instructions stored in a memory device such as a non-transitory computer-readable medium. The processing device 112 can execute the instructions to map narrowband uplink signals to antenna ports. The processing device 112 can configure the combiner devices 114 to combine specified subsets of narrowband uplink signals based on the information obtained from the mapping module 118.

In a DAS 104 or other RF distribution system, multiple remote units 108a, 108b, 108c can receive uplink signals from terminal devices that communicate with one or more of the base stations 101a, 101b via the DAS 104. A given base station may have a limited number of receiver antenna ports (e.g., two, four, or eight ports) or other ports configured for receiving uplink signals. The number of uplink signals to be provided to one or more of the base stations 101a, 101b from a master unit or other unit 106 may exceed the number of antenna ports available to the base station for receiving uplink signals. The unit 106 can include one or more combiner devices 114 for combining uplink signals that are to be transmitted to a base station. The number of combined uplink signals transmitted to the base station can be less than or equal to the number of receiver antenna ports available at the base station.

In an example, for a DAS system that is compliant with a Long-Term Evolution ("LTE") standard, intelligent multistage combining can be performed on uplink signals such as single-carrier frequency-division multiple access ("SC-FDMA") signals. An intelligent multistage combining sub-system can operate on individual uplink signals received from a terminal device. In some aspects, the intelligent multistage combining sub-system 110 can automatically adapt to parameters of an LTE system or other telecommunication system. Examples of such parameters include frequency assignments for different terminal devices, SC-FDMA carrier positions, etc.

Figure 2:
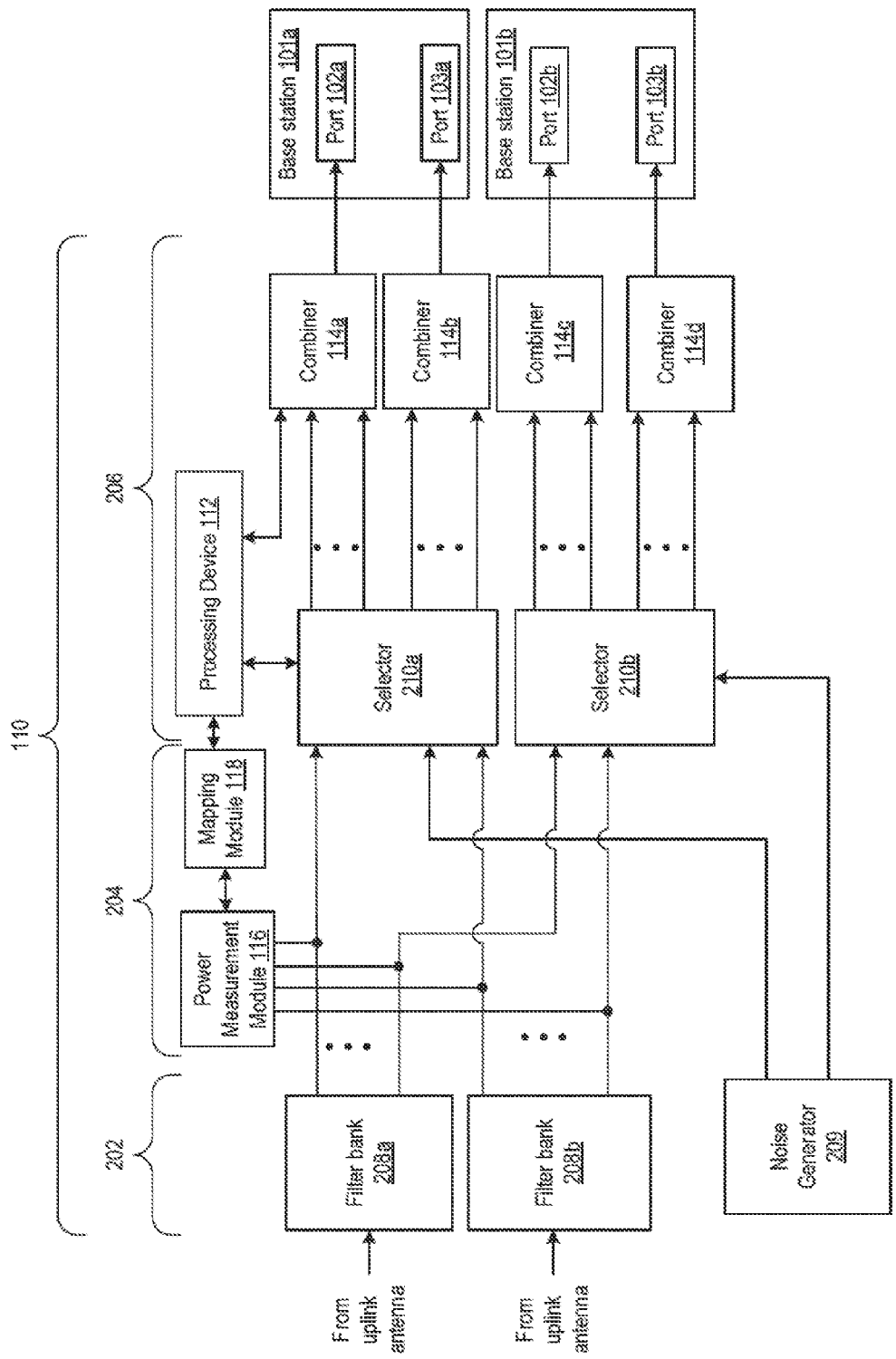
FIG. 2 is a block diagram depicting an example of the multistage combining sub-system of FIG. 1 according to one aspect of the present disclosure.

FIG. 2 is a block diagram depicting an example of the multistage combining sub-system 110. The multistage combining sub-system 110 can include processing stages 202, 204, 206.

In the processing stage 202, the combining sub-system 110 can split or otherwise divide uplink signals received by the remote units 108a, 108b, 108c. For example, the combining sub-system 110 can split or otherwise divide broadband uplink RF signals received via uplink antennas of one or more of the remote units 108a, 108b, 108c. The broadband uplink RF signal can be split or otherwise divided into multiple narrowband uplink signals. In some aspects, the narrowband uplink signals may at least partially overlap one another. In other aspects, the respective frequencies of the narrowband uplink signals may be spaced apart from one another such that the narrowband uplink signals do not overlap one another. In some aspects, the processing stage 202 can be implemented using devices in the remote units 108a, 108b, 108c. In other aspects, the processing stage 202 can be implemented in a unit 106.

In some aspects, the processing stage 202 can include one or more filter banks 208a, 208b that can be used for splitting or otherwise sub-dividing broadband uplink signals. Although, for illustrative purposes, only two filter banks 208a, 208b are depicted in FIG. 2, any number of filter banks can be included in the processing stage 202. For example, each of the remote units 108a, 108b, 108c can include a respective filter bank.

Each of the filter banks 208a, 208b can be configured based on a telecommunication standard used by the DAS 104. For example, one or more of the filter banks 208a, 208b can be configured to split or otherwise divide uplink signals in a 3GPP SC-FDMA uplink format, in which a given terminal device is assigned one or more physical resource blocks of 180 kHz for a slot of one millisecond.

In some aspects, the individual bandwidth of each narrowband uplink signal can be the same or similar (e.g., on the same order). Utilizing similar bandwidth for narrowband uplink signals can reduce the effects of energy spillover from terminal devices operating in adjacent frequencies. For example, two or more terminal devices may transmit uplink signals having frequencies that are adjacent to one another in a frequency spectrum. An energy spillover can involve signal power from a first uplink signal transmitted by a first terminal device being included in a narrowband uplink signal for a second uplink signal transmitted by a second terminal device. Using a bandwidth for each narrowband that is the same or similar can decrease the impact of this energy spillover. In some aspects, increasing the number of the remote units 108a, 108b, 108c can decrease the probability of terminal devices transmitting signals in adjacent frequencies and reduce the overall impact of the energy spillover.

In some aspects, the filters used by the filter banks 208a, 208b can have sufficiently narrow passbands that the resulting narrowband signals do not experience energy spillover. Such filters may be more complex than filters with wider passbands. In other aspects, the filters used by the filter banks 208a, 208b can have passbands that may not provide sufficient spacing between narrowband signals to eliminate all energy spillover. In these aspects, energy spillover may be less likely if the DAS includes a sufficiently large number of remote units to reduce the probability that terminal devices will operate in adjacent frequencies.

In some aspects, a noise generator 209 can be included in the processing stage 202. The noise generator 209 can be used to generate a minimal level or low level of noise. The noise generated by the noise generator 209 in the processing stage 202 can be provided to the processing stage 206. The noise from the noise generator 209 can be mapped to one or more unused ports of one or more of the base stations 101a, 101b. Providing the minimal level or low level of noise from the noise generator 209 to an unused port of one or more of the base stations 101a, 101b can prevent one or more of the base stations 101a, 101b from deactivating the unused port or otherwise disconnecting the base station from the unit 106. For example, one or more of the base stations 101a, 101b can control the output power used by terminal devices in communication with the base station. It may be desirable for one or more of the base stations 101a, 101b to detect a similar power level at each antenna port. The desirable power level can depend on the receiver and DAS noise for one or more of the base stations 101a, 101b. The receiver and DAS noise for one or more of the base stations 101a, 101b can be the sum of the receiver noise power, the noise power associated with the DAS 104, and a target value for the signal-to-interference-plus-noise ratio. One or more of the base stations 101a, 101b may be unable to measure the receiver and DAS noise during a period in which uplink signals are being received via an antenna port. One or more of the base stations 101a, 101b can estimate the receiver and DAS noise and recalibrate the expected receiver and DAS noise during idle periods. The noise generator 209 module can provide an additional noise source that can be measured by one or more of the base stations 101a, 101b during such an idle period in addition to the noise of the base station's low noise amplifier.

In the processing stage 204, the combining sub-system 110 can identify at least some of the narrowband uplink signals that include useful information. The uplink signals can be received by antenna elements of one or more of the remote units 108a, 108b, 108c. Narrowband uplink signals having useful information can be identified for one or more the remote units 108a, 108b, 108c. The processing stage 204 can be implemented in any suitable unit 106, such as a master unit or an extension unit.

The processing stage 204 can include the power measurement module 116. In some aspects, the power measurement module 116 of the processing stage 204 can include one or more power measurement devices. The power measurement module 116 can be coupled to signal paths from outputs of the filter banks 208a, 208b, as depicted in FIG. 2. The power measurement module 116 can use the power measurement devices to identify respective signal powers for each of the narrowband uplink signals outputted from the filter banks 208a, 208b. In other aspects, the processing stage 204 can be implemented by using the processing device 112 to execute program instructions included in a power measurement module 116. The processing device 112 can be communicatively coupled to signal paths from outputs of the filter banks 208a, 208b. The processing device 112 can sample the narrowband uplink signals from the signal paths. The processing device 112 can execute suitable program instructions to identify signal power in each of the sampled narrowband uplink signals. In some aspects, the processing device 112 can execute suitable program instructions that configure the processing device 112 to perform a spectral analysis of a signal at an input of a filter bank. The spectral analysis can be used to measure or otherwise determine a power profile of the signal at the input of the filter bank. The power profile can be used to determine which of the resulting narrowband uplink signals have useful information. The spectral analysis can be perform in any suitable manner (e.g., using a discrete Fourier transform, using a fast Fourier transform, etc.).

In some aspects, the combining sub-system 110 can identify narrowband uplink signals having useful information using power measurements of the narrowband uplink signals during short intervals of time. For example, for a given set of narrowband uplink signals, the combining sub-system 110 can identify a subset of narrowband uplink signals as having useful information based on the subset of narrowband uplink signals having respective signals powers that exceed a threshold signal power. In some aspects, the threshold signal power may be adaptive to a momentary power distribution. For example, the threshold signal power may be automatically determined using a power distribution associated with the broadband signal used to generate the narrowband uplink signals.

In additional or alternative aspects, narrowband uplink signals with useful information can be identified using characteristics in addition to or other the power of the narrowband uplink signals. For example, aspects, narrowband uplink signals with useful information can be identified using correlation characteristics. In some aspects in which narrowband signals above a threshold signal power are not present, highly correlated signals below the threshold signal power may be identified as having useful information. In other aspects, a determination of whether narrowband signals above a threshold signal power have useful information may be are qualified based on correlation characteristics. Weakly correlated signals above a threshold signal power can be routed to independent base station ports to improve reception for multiple-input/multiple-output ("MIMO") communications.

The processing stage 204 can also include the mapping module 118. The mapping module 118 can map narrowband uplink signals having useful information to one or more of the antenna ports 102a, 102b, 103a, 103b of one or more of the base stations 101a, 101b. In some aspects, mapping uplink signals to one or more of the antenna ports 102a, 102b, 103a, 103b can involve assigning narrowband uplink signals from each terminal device to a respective antenna port or set of antenna ports. In other aspects involving multi-user MIMO communication, mapping uplink signals to one or more of the antenna ports 102a, 102b, 103a, 103b can involve assigning narrowband uplink signals from a group of terminal devices to a respective set of antenna ports of one or more of the base stations 101a, 101b.

In some aspects, the mapping of narrowband uplink signals to antenna ports can be frequency independent. For example, each set of narrowband uplink signals can correspond to a given frequency band. The frequency assignment of narrowband uplink signals can be maintained. For a set of input and output narrowband uplink signals with same frequency assignment, the mapping rule can be independent from any other frequency.

In some aspects, the mapping of narrowband uplink signals to antenna ports can be static. For example, if a given terminal device remains within a given coverage zone serviced by one or more of the remote units 108a, 108b, 108c, the mapping of narrowband uplink signals received from the terminal device to one or more antenna ports of a base station can remain unchanged over a period of time during which the terminal device remains in the coverage zone.

In some aspects, the mapping module 118 can map narrowband uplink signals to one or more of the antenna ports 102a, 102b, 103a, 103b based on geographical locations of the remote units 108a, 108b, 108c. For example, the mapping module 118 can map narrowband uplink signals to one or more of the antenna ports 102a, 102b, 103a, 103b based on one or more of the spatial distribution or installation positions of the remote units 108a, 108b, 108c. The mapping module 118 can access data stored in a non-transitory computer-readable medium that identifies geographical locations of the remote units 108a, 108b, 108c. The data can also identify specific base stations 101a, 101b or antenna ports 102a, 102b, 103a, 103b for providing signal coverage in these geographical locations. The mapping module 118 can map a given narrowband uplink signal to one or more of the antenna ports 102a, 102b, 103a, 103b based on the narrowband uplink signal having useful information (as determined using the power measurement module 116) and the narrowband uplink signal being received by a specific one of the remote units 108a, 108b, 108c having a specific geographic location. In one example, remote units may be positioned on different floors or positioned over large distances. Strong signals being received on multiple remote units can indicate a higher probability that multiple terminal devices are operating in MU-MIMO mode. The different signals received from the different terminals devices can be routed to different base station ports. In another example, correlation characteristics between remote units can be monitored over a specified period of time. Specific uplink paths may exhibit a low amount of correlation or a lack of correlation of the time period. Signals traversing uncorrelated signal paths can be routed to different base station ports.

In some aspects, the mapping module 118 can map narrowband uplink signals having useful information to one or more of the antenna ports 102a, 102b, 103a, 103b based on physical random access channel ("PRACH") signaling. PRACH signaling can allow multiple terminal devices to simultaneously transmit uplink signals in an uncoordinated manner. For example, multiple terminal devices may transmit uplink signals at the same time. The simultaneous transmission of uplink signals can increase the number of the remote units 108a, 108b, 108c that contribute narrowband uplink signals with useful information to the processing stage 206. For a known time-to-frequency assignment of the PRACH channel, a specific rule set can be used or the number of selector outputs can be configured for the known time-to-frequency assignment of the PRACH channel. For example, the combining sub-system 110 can include a non-transitory computer-readable medium that stores data describing the timing and frequencies used for PRACH signaling with respect to different base stations 101a, 101b. The mapping module 118 can identify specific narrowband uplink signals that are received during a time period associated with PRACH signaling and that have frequencies associated with PRACH signaling. The mapping module 118 can map the identified narrowband uplink signals to specific antenna ports based on the identified narrowband uplink signals having the timing and frequencies associated with PRACH signaling. In some aspects, one or more of the base stations 101a, 101b can assign frequencies to different terminal devices on a slot-by-slot basis. For example, one or more of the base stations 101a, 101b can assign frequency resources to terminal devices according to a schedule of time slots. Each frequency assignment to a given terminal device can be performed for a respective time slot (e.g., after each 0.5 millisecond slot). The combining sub-system 110 can store information in a non-transitory computer-readable medium that identifies specific frequencies assigned to specific terminal devices. The combining sub-system 110 can update the mapping of narrowband uplink signals to antenna ports of one or more of the base stations 101a, 101b based on changes in frequency assignments to terminal devices. The mapping of narrowband uplink signals to antenna ports can be updated at the beginning of each slot.

In some aspects, the combining sub-system 110 can update the mapping of narrowband uplink signals to antenna ports without the combining sub-system 110 having information about slot timing and without the base stations 101a, 101b identifying the frequency assignments for terminal devices (e.g., by performing signaling that identifies frequency assignments for terminal devices). For example, the combining sub-system 110 can update mapping assignments at a high rate (e.g. every 2.5 microseconds) based on the powers of respective narrowband uplink signals during a given slot. The combining sub-system 110 can perform a consistency check in time and frequency to improve the result. In some aspects involving LTE systems, the combining sub-system 110 can manage mapping assignments for Physical Uplink Control Channel ("PUCCH") signaling and Physical Downlink Control Channel ("PDDSCH") signaling. In other aspects involving technologies in addition to or instead of LTE, the combining sub-system 110 can manage other types of mapping assignments.

In additional or alternative aspects, the combining sub-system 110 can update the mapping of narrowband uplink signals to antenna ports using information about slot timing but without the base stations 101a, 101b identifying the frequency assignments for terminal devices (e.g., by performing signaling that identifies frequency assignments for terminal devices). The combining sub-system 110 can update mapping assignments at the start of each slot based on a schedule of time slots stored in a non-transitory computer-readable medium that is accessible to the combining sub-system 110. For example, the processing device 112 can determine that a start time for a slot has been reached and can configure the power measurement module 116 to measure the signal power for the respective narrowband uplink signals during a short interval of time associated with the slot (e.g., during a time slot used by a telecommunication provider or some portion of the slot). The combining sub-system 110 can determine the mapping assignments from a power profile or other set of data that describes, depicts, or otherwise identifies the signal powers of respective narrowband uplink signals. The combining sub-system 110 can store assignments for a given power profile as a database or other suitable data structure in a non-transitory computer-readable medium. Based on the power measurements, the combining sub-system 110 can identify assignments from the database or create new assignments in the database. In aspects involving LTE systems, the multistage combining sub-system can manage mapping assignments for PUCCH, PUSCH, and PRACH in the same way. In other aspects involving technologies in addition to or instead of LTE, the combining sub-system 110 can manage other types of mapping assignments.

In additional or alternative aspects, the combining sub-system 110 can update the mapping of narrowband uplink signals to antenna ports using information about slot timing and information provided by one or more the base stations 101a, 101b that identifies the frequency assignments for terminal devices (e.g., by performing signaling that identifies frequency assignments for terminal devices). The processing device 112 can use the mapping module 118 to generate a profile for each terminal device that maps narrowband uplink signals received from the terminal device via one or more of the remote units 108a, 108b, 108c to one or more of the antenna ports 102a, 102b, 103a, 103b. The processing device 112 can use the mapping module 118 to generate an overall mapping assignment based on the frequency assignments from one or more of the base stations 101a, 101b and the terminal device profiles. The multistage combining sub-system 110 can manage mapping assignments for one or more of sounding reference signals, PUCCH, PUSCH, and PRACH in different ways. For example, if a base station has two antennas, PUCCH/PUSCH may involve one or two terminal devices transmitting uplink signals per frequency bin. For PUCCH/PUSCH, weak signal components may be discarded. For example, if the same uplink signal is received at two remote units from the same terminal device, and the uplink signal is stronger at one of the remote units, a weaker versions of the signal at another remote unit may be discarded. For PRACH, more terminal devices can transmit at a given time. For PRACH, the mapping algorithm may not discard weak signal components. In the processing stage 206, the combining sub-system 110 can select, combine, and provide the identified narrowband uplink signals with useful information to one or more of the antenna ports 102a, 102b, 103a, 103b. The processing stage 206 can be implemented in any suitable unit 106, such as (but not limited to) one or more master units.

The processing stage 206 can include selector devices 210a, 210b and combiner devices 114a-d that can be used to implement the mapping of narrowband uplink signals to one or more of the antenna ports 102a, 102b, 103a, 103b. In the processing stage 206, the combining sub-system 110 can select and combine narrowband uplink signals based on control data (e.g., a control vector) generated using the processing stage 204. For example, the processing device 112 can provide one or more control signals to the selector devices 210a, 210b to select specific narrowband uplink signals identified from mapping data that is generated using the mapping module 118. Selecting specific narrowband uplink signals identified from mapping data can cause narrowband uplink signals without useful information to be excluded, muted, or otherwise attenuated prior to or during combining operations performed by one or more of the combiner devices 114a-d.

Each of the selector devices 210a, 210b can select a set of narrowband uplink signals outputted from one or more of the filter banks 208a, 208b for routing to the combiner devices 114a-d. In some aspects, the selector devices can be implemented in hardware. An example of a selector device is a switch matrix. In other aspects, the selectors can be implemented as software modules executed by the processing device 112. Each of the selector devices 210a, 210b can output the selected narrowband uplink signals to input ports of one or more of the combiner devices 114a-d. In some aspects, the selector devices 210a, 210b can include or be replaced by one or more attenuation devices. Multiple sets of narrowband uplink signals outputted from the filter banks 208a, 208b can be provided via the attenuation devices to each of the combiner devices 114a-d. The attenuation devices can be used to mute or otherwise attenuate selected signals prior to routing signals to the combiner devices 114a-d.

The combiner devices 114a-d can combine narrowband uplink signals that are selected using the selector devices 210a, 2106b. An example of a combiner device is an adding device that can add selected narrowband uplink signals and output a sum of the selected narrowband uplink signals. In some aspects, a terminal device may not operate in a MIMO mode, such as single-user MIMO or multi-user MIMO. For such aspects, the combiner devices 114a-d can be implemented as weighted adders. For example, each weight can be a normalized momentary power per branch. In some aspects that involve LTE systems with 180 kHz resource blocks or GSM systems using 200 kHz carrier bandwidth, the use of normalized momentary power for each branch can implement a multiport maximum ratio combining receiver. In other aspects involving standards other than LTE or GSM, phase alignment may be used to phase-align the signals to be combined.

Each of the functional blocks depicted in FIG. 2 can be implemented as hardware devices, software modules executed by a processing device, or some combination thereof. In some aspects, each of the processing stages 202, 204, 206 can be implemented using devices in the unit 106. In additional or alternative aspects, one or more of the processing stages 202, 204, 206 can be implemented using devices in one or more of the remote units 108a, 108b, 108c.

Figure 3:
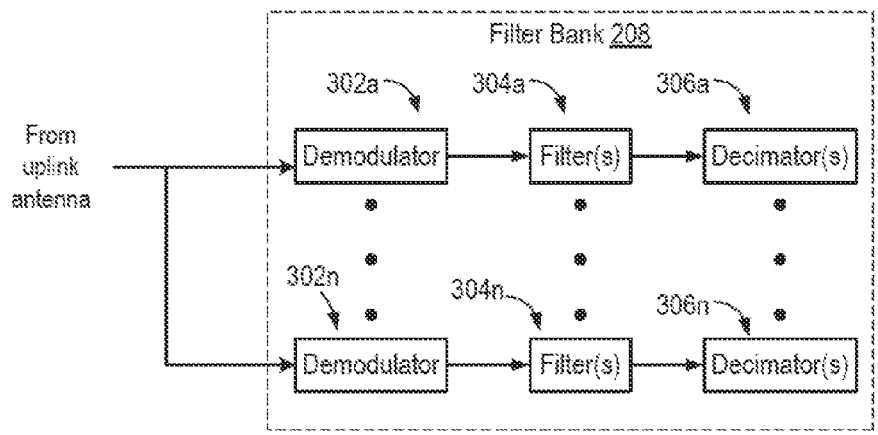
FIG. 3 is a block diagram that depicts an example of a filter bank used by the multistage combining sub-system of FIG. 1 according to one aspect of the present disclosure.

FIG. 3 is a block diagram that depicts an example of a filter bank 208 used by the multistage combining sub-system 110. The filter bank 208 can be used to split or otherwise divide broadband uplink signals into narrowband uplink signals. In some aspects, each narrowband uplink signal can be digitally represented as a complex baseband signal with a reduced sampling rate.

The filter bank 208 can include multiple signal paths that respectively include demodulators 302a-n, filters 304a-n (e.g., bandpass filters), and decimators 306a-n. A broadband uplink signal received using one of the remote units 108a, 108b, 108c can be provided to the filter bank 208. In some aspects, the broadband uplink signal can be converted to an IF signal prior to being provided to the filter bank 208.

The filter bank 208 can be configured to output n narrowband uplink signals. Each of the n narrowband uplink signals can have the same bandwidth.

As depicted in FIG. 3, the filter bank 208 can include a set of n complex demodulators (i.e., demodulators 302a-n). Each complex demodulator can output a frequency-shifted version of the broadband uplink signal by performing a complex demodulation on the broadband uplink signal. The output of each complex demodulator can be a respective complex baseband signal. For example, each of the demodulators 302a-n can include two mixers and a 90-degree splitter that can be used to output an IQ signal (i.e. a complex baseband signal). Each complex baseband signal can be used to obtain a respective narrowband uplink signal. The group of complex demodulators for the filter bank 208 can be used to output a set of narrowband uplink signals that are equally spaced in a frequency band.

The frequency shift performed by each of n complex demodulators can be represented by the function $$f_n + n\frac{BW_n}{m_n}.$$

The term $f_n$ represents the lowest frequency component of a given broadband uplink signal. The term $BW_n$ represents the useful signal bandwidth of a complex narrowband uplink signal. The term $m_n$ represents a step width for adjacent narrowband uplink signals. The step width can be a difference in frequencies for adjacent narrowband uplink signals. The step width can define an amount of overlap ratio between adjacent narrowband uplink signals. In some aspects, the step width can be selected to provide, for example, a 50% overlap between narrowband uplink signals in the frequency band of interest. In other aspects, other amounts of overlap can be used.

The output of the complex demodulators can be a set of frequency-shifted uplink signals. For example, the demodulators 302a-n can receive a broadband uplink signal having a frequency $f_1$. The complex demodulators can be configured to use a bandwidth $BW_1$ and a step width of $m_1$. A first one of the demodulators 302a-n can output the broadband uplink signals without a frequency shift (i.e. with the frequency $f_1$). A second one of the demodulators 302a-n can generate a frequency-shifted uplink signal with a frequency of $$f_1 + \frac{BW_1}{m_1}.$$

A third one of the demodulators 302a-n can generate a frequency-shifted uplink signal with a frequency of $$f_1 + \frac{2BW_1}{m_1}.$$

The filters 304a-n can be implemented in any manner suitable for extracting or otherwise obtaining sets of narrowband uplink signals from the received uplink signals. In some aspects, the filters 304a-n can be implemented in a manner suitable for use with complex signal representations. In other aspects, the filters 304a-n can be implemented in a manner suitable for use with real signal representations. In some aspects involving complex signal representations, the filters 304a-n can be low-pass filters. In other aspects, the filters 304a-n can be bandpass filters.

The filters 304a-n can receive respective frequency-shifted uplink signal from the demodulators 302a-n. Each of the filters 304a-n for a given one of the filter bank 208 can be configured with the same passband with the bandwidth $BW_n$. Each of the filters 304a-n can be, for example, a bandpass filter having a center frequency that is the same as or otherwise corresponds to a center frequency of each frequency shifted signal.

The filter bank 208 can include decimators 306a-n respectively following the filters 304a-n. Each of the decimators 306a-n can decimate a respective narrowband uplink signal to reduce the sampling rate of the narrowband uplink signal. Reducing the sampling rate of the narrowband uplink signals can allow the set of narrowband uplink signals to be compressed. In some aspects, reducing the sampling rate of the narrowband uplink signals can allow a number of bits used for each complex sample to be minimized (e.g., due to a reduced dynamic range of the narrowband uplink signals, due to introducing a different number format such as a complex mantissa and a real exponent, etc.). In some aspects in which the filter bank 208 is included in a remote unit, the decimators 306a-n can be used to compress sets of narrowband uplink signals for transmission to the unit 106. In other aspects in which the filter bank 208 is included in a unit 104, the decimators 306a-n can be omitted.

In some aspects, the filter bank 208 can be implemented using a processing device that can execute suitable program code. Examples of a processing device include a microprocessor, an ASIC, an FPGA, or other suitable processing device. The processing device may include any number of processors, including one. The program code can be stored in any non-transitory computer-readable medium capable of tangibly embodying executable instructions and can include electronic, magnetic, or optical devices.

Figure 4:
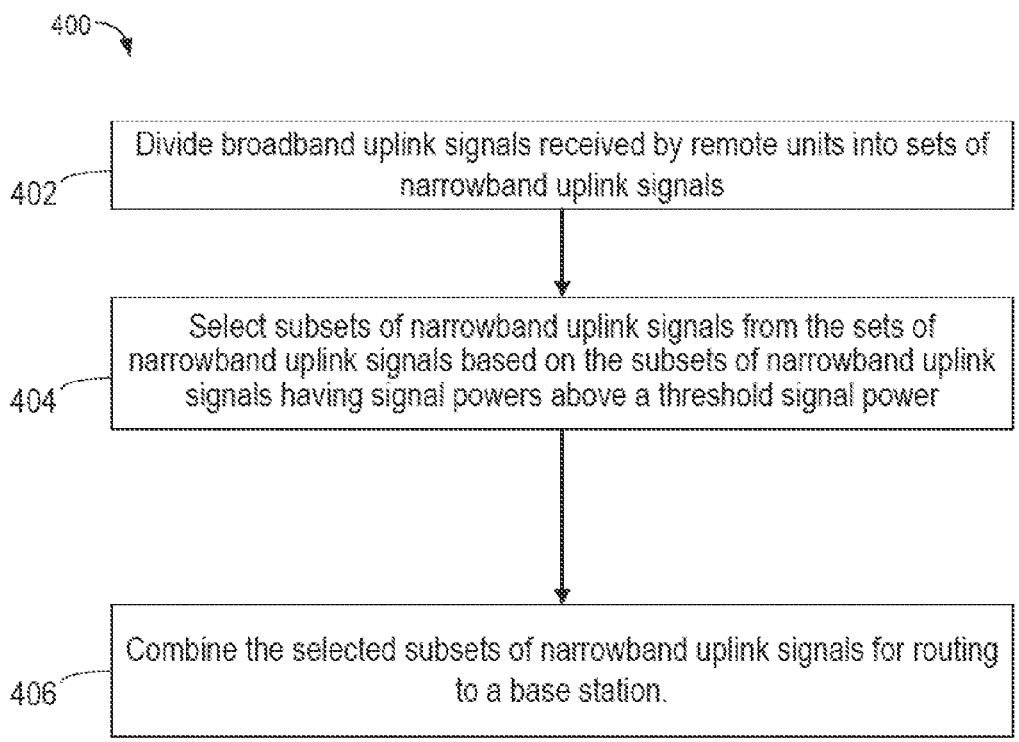
FIG. 4 is a flow chart depicting an example of a process for selectively combining narrowband uplink signals in a DAS according to one aspect of the present disclosure.

FIG. 4 is a flow chart depicting an example of a process 400 for selectively combining narrowband uplink signals in a DAS 104. The process 400 is described with respect to one or more of the aspects and examples described above with respect to FIGS. 1-3. Other implementations, however, are possible.

The process 400 involves dividing broadband uplink signals received by remote units into sets of narrowband uplink signals, as depicted in block 402. For example, the combining sub-system 110 can divide broadband uplink signals received via one or more of the remote units 108a,

108*b*, 108*c* into sets of narrowband uplink signals using one or more devices in the processing stage 202, as described above with respect to FIG. 2.

In some aspects, the combining sub-system 110 can use filter banks 208*a*, 208*b* for dividing broadband uplink signals received by remote units into sets of narrowband uplink signals. For example, a first broadband uplink signal received by a first remote unit can be provided to a first filter bank 208*a* and a second broadband uplink signal received by a second remote unit can be provided to a second filter bank 208*b*. Each filter bank can use at least some of the demodulators 302*a-n* to respectively generate first and second sets of frequency-shifted uplink signals from the first and second broadband uplink signal. Each filter bank can use at least some of the filters 304*a-n* to respectively filter the first and second sets of frequency-shifted uplink signals to generate sets of narrowband uplink signals. In some aspects, the filters 304*a-n* can be bandpass filters having respective center frequencies corresponding center frequencies of the frequency-shifted uplink signal. In some aspects, each filter bank can use at least some of the decimators 306*a-n* to down-sample the narrowband uplink signals for transmission to a master unit, an extension unit, or other suitable unit 104.

The process 400 also involves selecting subsets of narrowband uplink signals from the sets of narrowband uplink signals based on the subsets of narrowband uplink signals having signal powers above a threshold signal power, as depicted in block 404. For example, the combining sub-system 110 can select subsets of narrowband uplink signals from the sets of narrowband uplink signals using one or more devices in the processing stage 204, as described above with respect to FIG. 2.

In some aspects, the subsets of narrowband uplink signals can be selected based on a mapping that associates one or more of the antenna ports 102*a*, 102*b*, 103*a*, 103*b* with one or more of the remote units 108*a*, 108*b*, 108*c*. A processing device of the combining sub-system 110 (such as, but not limited to, a processing device 112 executing instructions in a mapping module 118 or a dedicated processing device in the mapping module 118) can identify the mapping by accessing data in a non-transitory computer-readable medium accessible to the processing device. The processing device can configure one or more of the selector devices 210*a*, 210*b* to select the subsets of narrowband signals based on the mapping. In some aspects, this selection criteria can be used in addition to one or more other criteria (e.g., the subsets of narrowband signals having signal powers greater than a threshold signal power).

In additional or alternative aspects, the subsets of narrowband uplink signals can be selected based on a mapping that associates one or more of the antenna ports 102*a*, 102*b*, 103*a*, 103*b* with one or more frequencies and one or more times periods that are used for signaling the base station to establish communication with terminal devices (e.g., frequencies and time slots used for PRACH signaling). A processing device of the combining sub-system 110 (such as, but not limited to, a processing device 112 executing instructions in a mapping module 118 or a dedicated processing device in the mapping module 118) can identify the mapping by accessing data in a non-transitory computer-readable medium accessible to the processing device. The processing device can configure one or more of the selector devices 210*a*, 210*b* to select the subsets of narrowband signals based on the mapping. In some aspects, this selection criteria can be used in addition to one or more other criteria (e.g., the subsets of narrowband signals having signal powers greater than a threshold signal power, mappings between remote units and antenna ports, etc.).

In additional or alternative aspects, the subsets of narrowband uplink signals can be selected for routing to at least some of the antenna ports 102*a*, 102*b*, 103*a*, 103*b* based on the original broadband uplink signals being received using a MIMO configuration. A processing device of the combining sub-system 110 (such as, but not limited to, a processing device 112 executing suitable instructions or a dedicated processing device in the mapping module 118) can determine that two or more broadband uplink signals have been received by at least two antenna elements in one or more of the remote units 108*a*, 108*b*, 108*c* using a MIMO configuration. The processing device can configure one or more of the selector devices 210*a*, 210*b* to select the subsets of narrowband signals based on the corresponding broadband uplink signals being received using a MIMO configuration. In some aspects, this selection criteria can be used in addition to one or more other criteria (e.g., the subsets of narrowband signals having signal powers greater than a threshold signal power, mappings between remote units and antenna ports, mappings between antenna ports and resources used for signaling the base station to establish communication with terminal devices, etc.).

The process 400 also involves combining the selected subsets of narrowband uplink signals for routing to a base station, as depicted in block 406. For example, the combining sub-system 110 can combine selected subsets of narrowband uplink signals using one or more combiner devices 114*a-d* in the processing stage 206, as described above with respect to FIG. 2. In some aspects, combining the selected signals can involve excluding, muting, or otherwise attenuating narrowband uplink signals that are not included in the selected subsets of narrowband uplink signals from the combining operation.

While the present subject matter has been described in detail with respect to specific aspects and features thereof, it will be appreciated that those skilled in the art, upon attaining an understanding of the foregoing may readily produce alterations to, variations of, and equivalents to such aspects and features. Each of the disclosed aspects, examples, and features can be combined with one or more of the other disclosed aspects, examples, and features. Accordingly, it should be understood that the present disclosure has been presented for purposes of example rather than limitation, and does not preclude inclusion of such modifications, variations and/or additions to the present subject matter as would be readily apparent to one of ordinary skill in the art.

The invention claimed is:

1. A method comprising:
   receiving a first broadband uplink signal from a first remote antenna unit of a distributed antenna system and a second broadband uplink signal from a second remote antenna unit of the distributed antenna system;
   dividing the first broadband uplink signal into a first plurality of narrowband uplink signals and the second broadband uplink signal into a second plurality of narrowband uplink signals;
   identifying a mapping of the first plurality of narrowband uplink signals to an antenna port of a base station based on a first geographic location of the first remote antenna unit;
   identifying a mapping of the second plurality of narrowband uplink signals to the antenna port of the base station based on a second geographic location of the second remote antenna unit;

selecting a first subset of narrowband uplink signals from the first plurality of narrowband uplink signals and a second subset of narrowband uplink signals from the second plurality of narrowband uplink signals based on the first subset of narrowband uplink signals and the second subset of narrowband uplink signals having signal powers above a threshold signal power, wherein the first subset of narrowband uplink signals and the second subset of narrowband uplink signals are also selected based on the mapping associating the antenna port with the first remote antenna unit and the second remote antenna unit; and combining the selected first subset of narrowband uplink signal and the selected second subsets of narrowband uplink signals for routing to the base station, wherein combining the selected first subset of narrowband uplink signals and the selected second subset of narrowband uplink signals comprises excluding narrowband uplink signals outside the selected first subset of narrowband uplink signals and the selected second subset of narrowband uplink signals from the combining operation.

2. The method of claim 1, further comprising identifying an additional mapping of the first plurality of narrowband uplink signals and the second plurality of narrowband uplink signals to the antenna port of the base station based on the first plurality of narrowband uplink signals and the second plurality of narrowband uplink signals being associated with at least one frequency and at least one time period used for signaling the base station to establish communication with terminal devices, wherein the first subset of narrowband uplink signals and the second subset of narrowband uplink signals are also selected for the combining operation based on the additional mapping associating the at least one frequency and the at least one time period with the antenna port.

3. The method of claim 1, further comprising:
generating a first mapping for a first time slot used for communication with the base station, wherein the first mapping associates the antenna port of the base station with frequencies of the first subset of narrowband uplink signals and the second subset of narrowband uplink signals;

obtaining, during a second time slot used for communication with the base station, a third subset of narrowband uplink signals from a third broadband uplink signal and a fourth subset of narrowband uplink signals from a fourth broadband uplink signal based on the third subset of narrowband uplink signals and the fourth subset of narrowband uplink signals having signal powers above the threshold signal power; and generating a second mapping for the second time slot, wherein the second mapping associates the antenna port with frequencies of the third subset of narrowband uplink signals and the fourth subset of narrowband uplink signals.

4. The method of claim 1, wherein the first broadband uplink signal and the second broadband uplink signal are received using the first remote antenna unit and the second remote antenna unit in a multiple-input/multiple-output configuration, wherein the first subset of narrowband uplink signals and the second subset of narrowband uplink signals are also selected for the combining operation based on the first broadband uplink signal and the second broadband uplink signal being received in the multiple-input/multiple-output configuration.

5. The method of claim 1, wherein dividing the first broadband uplink signal into the first plurality of narrowband uplink signals and the second broadband uplink signal into the second plurality of narrowband uplink signals comprises:

providing the first broadband uplink signal to a first filter bank and the second broadband uplink signal to a second filter bank;

generating, by the first filter bank, a first plurality of frequency-shifted uplink signals from the first broadband uplink signal;

generating, by the second filter bank, a second plurality of frequency-shifted uplink signals from the second broadband uplink signal;

filtering, by a first plurality of filters in the first filter bank, the first plurality of frequency-shifted uplink signals to generate the first plurality of narrowband uplink signals; and filtering, by a second plurality of filters in the second filter bank, the second plurality of frequency-shifted uplink signals to generate the second plurality of narrowband uplink signals, wherein each filter of the second plurality of filters has a passband corresponding to a specified bandwidth for each narrowband uplink signal.

6. The method of claim 5, wherein each filter of the first plurality of filters and the second plurality of filters comprises a respective bandpass filter having a respective center frequency corresponding to a respective additional center frequency of the respective frequency-shifted uplink signal.

7. The method of claim 5, further comprising reducing a sampling rate of the first plurality of narrowband uplink signals and the second plurality of narrowband uplink signals and transmitting the first plurality of narrowband uplink signals and the second plurality of narrowband uplink signals with the reduced sampling rate to a master unit of the distributed antenna system.

8. A combining sub-system comprising:
a first filter bank configured for dividing a first broadband uplink signal received from a first remote antenna unit of a distributed antenna system into a first plurality of narrowband uplink signals;

a second filter bank configured for dividing a second broadband uplink signal received from a second remote antenna unit of the distributed antenna system into a second plurality of narrowband uplink signals;

at least one selector device configured for selecting a first subset of narrowband uplink signals from the first plurality of narrowband uplink signals and a second subset of narrowband uplink signals from the second plurality of narrowband uplink signals based on the first subset of narrowband uplink signals and the second subset of narrowband uplink signals having signal powers above a threshold signal power;

at least one combiner device configured for combining the selected first subset of narrowband uplink signals and the selected second subset of narrowband uplink signals for routing to a base station, wherein combining the selected first subset of narrowband uplink signals and the selected second subset of narrowband uplink signals comprises excluding narrowband uplink signals outside the selected first subset of narrowband uplink signals and the selected second subsets of narrowband uplink signals from the combining operation; and a processing device configured for:
identifying a mapping of the first plurality of narrowband uplink signals to an antenna port of the base station based on a first geographic location of the first remote antenna unit;

identifying a mapping of the second plurality of narrowband uplink signals to the antenna port of the base station based on a second geographic location of the second remote antenna unit; and configuring the at least one selector device for selecting the first subset of narrowband uplink signals and the second subset of narrowband uplink signals based on the mapping associating the antenna port with the first remote antenna unit and the second remote antenna unit.

9. The combining sub-system of claim 8, wherein the processing device is configured for:

identifying an additional mapping of the first plurality of narrowband uplink signals and the second plurality of narrowband uplink signals to the antenna port of the base station based on the first plurality of narrowband uplink signals and the second plurality of narrowband uplink signals being associated with at least one frequency and at least one time period used for signaling the base station to establish communication with terminal devices; and configuring the at least one selector device for selecting the first subset of narrowband uplink signals and the second subset of narrowband uplink signals based on the additional mapping associating the at least one frequency and the at least one time period with the antenna port.

10. The combining sub-system of claim 8, further comprising a processing device configured for:

generating a first mapping for a first time slot used for communication with the base station, wherein the first mapping associates the antenna port of the base station with frequencies of the first subset of narrowband uplink signals and the second subset of narrowband uplink signals;

identifying, during a second time slot used for communication with the base station, a third subset of narrowband uplink signals from a third broadband uplink signal and a fourth subset of narrowband uplink signals from a fourth broadband uplink signal, wherein the third subset of narrowband uplink signals and the fourth subset of narrowband uplink signals are identified based on having signal powers above the threshold signal power; and generating a second mapping for the second time slot, wherein the second mapping associates the antenna port with frequencies of the third subset of narrowband uplink signals and the fourth subset of narrowband uplink signals.

11. The combining sub-system of claim 8, further comprising a processing device configured for:

determining that the first broadband uplink signal and the second broadband uplink signal are received using the first remote antenna unit and the second remote antenna unit in a multiple-input/multiple-output configuration; and configuring the at least one selector device for selecting the first subset of narrowband uplink signals and the second subset of narrowband uplink signals based on the first broadband uplink signal and the second broadband uplink signal being received in the multiple-input/multiple-output configuration.

12. The combining sub-system of claim 11, wherein the first filter bank further comprises a first plurality of demodulators configured for generating a first plurality of frequency-shifted uplink signals from the first broadband uplink signal and a first plurality of filters configured for filtering the first plurality of frequency-shifted uplink signals to generate the first plurality of narrowband uplink signals;

wherein the second filter bank further comprises a second plurality of demodulators configured for generating a second plurality of frequency-shifted uplink signals from the second broadband uplink signal and a second plurality of filters configured for filtering the second plurality of frequency-shifted uplink signals to generate the second plurality of narrowband uplink signals;

wherein each filter of the first plurality of filters and the second plurality of filters has a passband corresponding to a specified bandwidth for each narrowband uplink signal.

13. The combining sub-system of claim 12, wherein each filter of the first plurality of filters and the second plurality of filters comprises a respective bandpass filter having a respective center frequency corresponding to a respective additional center frequency of the respective frequency-shifted uplink signal.

14. A distributed antenna system comprising:

a first remote antenna unit configured for receiving a first broadband uplink signal and dividing the first broadband uplink signal into a first plurality of narrowband uplink signals;

a second remote antenna unit configured for receiving a second broadband uplink signal and dividing the second broadband uplink signal into a second plurality of narrowband uplink signals; and a unit communicatively coupled to the first remote antenna unit and the second remote antenna unit and communicatively couplable to a base station, wherein the unit is configured for:

identifying a mapping of the first plurality of narrowband uplink signals to an antenna port of the base station based on a first geographic location of the first remote antenna unit;

identifying a mapping of the second plurality of narrowband uplink signals to the antenna port of the base station based on a second geographic location of the second remote antenna unit, selecting a first subset of narrowband uplink signals from the first plurality of narrowband uplink signals and a second subset of narrowband uplink signals from the second plurality of narrowband uplink signals based on the first subset of narrowband uplink signals and the second subset of narrowband uplink signals having signal powers above a threshold signal power and based on the mapping associating the antenna port with the first remote antenna unit and the second remote antenna unit, and combining the selected first subset of narrowband uplink signals and the selected second subsets subset of narrowband uplink signals for routing to the base station, wherein combining the selected first subset of narrowband uplink signals and the selected second subset of narrowband uplink signals comprises excluding narrowband uplink signals outside the selected first subset of narrowband uplink signals and the selected second subset of narrowband uplink signals from the combining operation.

15. The distributed antenna system of claim 14, wherein the unit is further configured for:

identifying an additional mapping of the first plurality of narrowband uplink signals and the second plurality of narrowband uplink signals to the antenna port of the base station based on the first plurality of narrowband uplink signals and the second plurality of narrowband uplink signals being associated with at least one frequency and at least one time period used for signaling the base station to establish communication with terminal devices; and selecting the first subset of narrowband uplink signals and the second subset of narrowband uplink signals for the combining operation based on the additional mapping associating the at least one frequency and the at least one time period with the antenna port.

16. The distributed antenna system of claim 14, wherein the unit is further configured for:

generating a first mapping for a first time slot used for communication with the base station, wherein the first mapping associates the antenna port of the base station with frequencies of the first subset of narrowband uplink signals and the second subset of narrowband uplink signals;

obtaining, during a second time slot used for communication with the base station, a third subset of narrowband uplink signals from a third broadband uplink signal and a fourth subset of narrowband uplink signals from a fourth broadband uplink signal based on the third subset of narrowband uplink signals and the fourth subset of narrowband uplink signals having signal powers above the threshold signal power; and generating a second mapping for the second time slot, wherein the second mapping associates the antenna port with frequencies of the third subset of narrowband uplink signals and the fourth subset of narrowband uplink signals.

17. The distributed antenna system of claim 14, wherein the first remote antenna unit and the second remote antenna unit are configured for a multiple-input/multiple-output configuration, wherein the unit is configured for selecting the first subset of narrowband uplink signals and the second subset of narrowband uplink signals based on the first broadband uplink signal and the second broadband uplink signal being received in the multiple-input/multiple-output configuration.

18. The distributed antenna system of claim 14, wherein the first remote antenna unit comprises a first filter bank configured for generating a first plurality of frequency-shifted uplink signals from the first broadband uplink signal and filtering the first plurality of frequency-shifted uplink signals to generate the first plurality of narrowband uplink signals;

wherein the second remote antenna unit comprises a second filter bank configured for generating a second plurality of frequency-shifted uplink signals from the second broadband uplink signal and filtering the second plurality of frequency-shifted uplink signals to generate the second plurality of narrowband uplink signals.

19. The distributed antenna system of claim 14, wherein the first remote antenna unit is further configured for reducing a sampling rate of the first plurality of narrowband uplink signals and transmitting the first plurality of narrowband uplink signals with the reduced sampling rate to the unit;

wherein the second remote antenna unit is further configured for reducing a sampling rate of the second plurality of narrowband uplink signals and transmitting the second plurality of narrowband uplink signals with the reduced sampling rate to the unit.

* * * * *